US008229865B2

(12) United States Patent
Campbell et al.

(10) Patent No.: US 8,229,865 B2
(45) Date of Patent: Jul. 24, 2012

(54) METHOD AND APPARATUS FOR HYBRID TAGGING AND BROWSING ANNOTATION FOR MULTIMEDIA CONTENT

(75) Inventors: Murray S. Campbell, Yorktown Heights, NY (US); Apostol I. Natsev, Harrison, NY (US); Rong Yan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/025,308

(22) Filed: Feb. 4, 2008

(65) Prior Publication Data
US 2011/0173141 A1    Jul. 14, 2011

(51) Int. Cl.
*G06F 15/18* (2006.01)
(52) U.S. Cl. ........................................................ 706/12
(58) Field of Classification Search ........................ None
See application file for complete search history.

(56) References Cited

U.S. PATENT DOCUMENTS

| | | | |
|---|---|---|---|
| 6,253,169 B1 | 6/2001 | Apte et al. | |
| 6,289,301 B1* | 9/2001 | Higginbotham et al. | 704/1 |
| 6,324,532 B1 | 11/2001 | Spence et al. | |
| 6,453,307 B1 | 9/2002 | Schapire et al. | |
| 6,662,170 B1 | 12/2003 | Dom et al. | |
| 7,124,149 B2 | 10/2006 | Smith et al. | |
| 7,139,754 B2 | 11/2006 | Goutte et al. | |
| 7,274,822 B2* | 9/2007 | Zhang et al. | 382/224 |
| 2003/0033288 A1* | 2/2003 | Shanahan et al. | 707/3 |
| 2003/0112357 A1* | 6/2003 | Anderson | 348/333.05 |
| 2004/0225686 A1* | 11/2004 | Li et al. | 707/104.1 |
| 2004/0242998 A1* | 12/2004 | Pan et al. | 600/437 |
| 2005/0027664 A1* | 2/2005 | Johnson et al. | 706/12 |
| 2007/0150801 A1* | 6/2007 | Chidlovskii et al. | 715/512 |
| 2009/0083332 A1* | 3/2009 | Datta et al. | 707/104.1 |
| 2009/0192967 A1* | 7/2009 | Luo et al. | 706/47 |
| 2010/0088170 A1* | 4/2010 | Glore, Jr. | 705/14.19 |

OTHER PUBLICATIONS

Barnard, et al. "Matching Words and Pictures". Journal of Machine Learning Research 3 (2003) 1107-1135.
Jeon, et al. "Automatic Image Annotation and Retrieval using Cross-Media Relevance Models" In Proceedings of the 26th annual international ACM SIGIR conference on Research and development in information retrieval, pp. 119-126, 2003.
Li, et al. "Real-time computerized annotation of pictures". In Proceedings of ACM Intl. conf. on Multimedia, pp. 911-920, 2006.
Kennedy, et al. "To Search or to Label? Predicting the Performance of Search-Based Automatic Image Classifiers". In proceedings of the 8th ACM international workshop on Multimedia information retrieval, pp. 24-258, New York, NY USA 2006.
Over, et al. "TREVID 2006-An Overview" Mar. 21, 2007. 32 pages.
Halaschek-Wiener, et al. "PhotoStuff—An Image Annotation Tool for the Semantic Web". In Proc. of 4th international semantic web conference, 2005.
Lan, et al. "Supervised and Traditional Term Weighting Methods for Automatic Text Categorization"; Pattern Analysis and Machine Intelligence, IEEE Transaction on vol. 31, Issue: 4 Digital Identifier: 10.1109/TPAM.2008.110 Publication year 2009' pp. 721-735.

(Continued)

*Primary Examiner* — Jeffrey A Gaffin
*Assistant Examiner* — Paulinho E Smith
(74) *Attorney, Agent, or Firm* — Cantor Colburn LLP; Preston Young

(57) ABSTRACT

A computer program product and embodiments of systems are provided for annotating multimedia documents. The computer program product and embodiments of the systems provide for performing manual and automatic annotation.

15 Claims, 7 Drawing Sheets

OTHER PUBLICATIONS

Saenko et al., "Multistream Articulatory Feature-Based Models for Visual Speech Recognition"; Pattern Analysis and Machine Intelligence, IEEE Transactions on vol. 31, Issue: 9; Digital Identifier: 10.1109/TPAMI.2008303 Publication year: 2009: pp. 1700-1707.

Sakk et al., "The Effect of Target Vector Selection on the Invariance of Classifier Performance Measures"; Neural Networks, IEEE Transactions on, vol. 20, Issue: 5 Digital Identifier: 10.1109/TNN.2008. 2011809 Publication year: 2009; pp. 745-757.

Su et al., "Research on Modeling Traversing Features in Concurrent Software System", Computer and Science and Software Engineering, 2008 International Conference on vol. 2; Digital Object Identifier: 10.1109/CSSE.2008.844 Publication year 2008; pp. 81-84.

R.E. Schapire, "Using output codes to boost multiclass learning problems," Proceedings of the Fourteenth International Conference on Machine Learning, pp. 1-9, 1997.

D. Tao, et al.; "Asymmetric Bagging and Random Subspace for Support Vector Machines-Based Relevance Feedback in Image Retrieval." IEEE Trans. Pattern Anal. Mach. Intel., vol. 28 No. 7: pp. 1088-1099, (2006).

Tin Kam Ho, "The Random Subspace Method for Constructing Decision Forests," IEEE Trans. Pattern Anal. mach. Intel. 1998.

L. Breiman. "Random Forests," Statistics Department University of California Berkeley, CA 94720, Jan. 2001. pp. 1-33.

R. Ando and T. Zhang in the publication entitled "A Framework for Learning Predictive Structures from Multiple Tasks and Unlabeled Data," Journal of Machine Learning Research 6 (2005) 1817-1853.

Snoek, et al. "The MediaMill TRECVID 2004 Semantic Video Search Engine" MediaMill, University of Amsterdam (2004).

Yan, et al. "Mining relationship between video concepts using probabilistic graphical models," Proceedings of IEEE International Conference on Multimedia and Expo (ICME), 2006.

\* cited by examiner

METHOD AND APPARATUS FOR HYBRID TAGGING AND BROWSING ANNOTATION FOR MULTIMEDIA CONTENT

STATEMENT REGARDING FEDERALLY SPONSORED RESEARCH

This invention was made with Government support under Contract No.: NBCHC070059 awarded by the Department of Defense. The Government has certain rights in this invention.

BACKGROUND OF THE INVENTION

1. Field of the Invention

The invention disclosed and claimed herein generally pertains to a method and apparatus for efficient annotation for multimedia content. More particularly, the invention pertains to a method and apparatus for speeding up the multimedia content annotation process by combining the common tagging and browsing interfaces into a hybrid interface.

2. Description of the Related Art

Recent increases in the adoption of devices for capturing digital media and the availability of mass storage systems has led to an explosive amount of multimedia data stored in personal collections or shared online. To effectively manage, access and retrieve multimedia data such as image and video, a widely adopted solution is to associate the image content with semantically meaningful labels. This process is also known as "image annotation." In general, there are two types of image annotation approaches available: automatic and manual.

Automatic image annotation, which aims to automatically detect the visual keywords from image content, has attracted a lot of attention from researchers in the last decade. For instance, Barnard et al. Matching words and pictures. Journal of Machine Learning Research, 3, 2002, treated image annotation as a machine translation problem. J. Jeon, V. Lavrenko, and R. Manmatha. Automatic image annotation and retrieval using cross-media relevance models. In Proceedings of the 26th annual international ACM SIGIR conference on Research and development in information retrieval, pages 119-126, 2003, proposed an annotation model called cross-media relevance model (CMRM) which directly computed the probability of annotations given an image. The ALIPR system (J. Li and J. Z. Wang. Real-time computerized annotation of pictures. In Proceedings of ACM Intl. Conf. on Multimedia, pages 911-920, 2006) uses advanced statistical learning techniques to provide fully automatic and real-time annotation for digital pictures. L. S. Kennedy, S.-F. Chang, and I. V. Kozintsev. To search or to label? predicting the performance of search-based automatic image classifiers. In Proceedings of the 8th ACM international workshop on Multimedia information retrieval, pages 249-258, New York, N.Y., USA, 2006. have considered using image search results to improve the annotation quality. These automatic annotation approaches have achieved notable success recently. In particular, they are shown to be most effective when the keywords have frequent occurrence and strong visual similarity. However, it remains a challenge for them to accurately annotate other more specific and less visually similar keywords. For example, an observation in the P. Over, T. Ianeva, W. Kraaij, and A. F. Smeaton. TrecVid 2006 overview. In NIST TRECVID-2006, 2006 notes that the best automatic annotation systems can only produce a mean average precision of seventeen percent on thirty nine semantic concepts for news video.

With regard to manual annotation, there has been a proliferation of such image annotation systems for managing online or personal multimedia content. Examples include PhotoStuff C. Halaschek-Wiener, J. Golbeck, A. Schain, M. Grove, B. Parsia, and J. Hendler. Photostuff - an image annotation tool for the semantic web. In Proc. of 4th international semantic web conference, 2005.for personal archives, Flickr. This rise of manual annotation partially stems from an associated high annotation quality for self-organization/retrieval purpose, and also an associated social bookmarking functionality that allows public search and self-promotion in online communities.

Manual image annotation approaches can be further categorized into two types. The most common approach is tagging, which allows the users to annotate images with a chosen set of keywords ("tags") from a controlled or uncontrolled vocabulary. Another approach is browsing, which requires users to sequentially browse a group of images and judge their relevance to a pre-defined keyword. Both approaches have strengths and weaknesses, and in many ways they are complementary to each other. But their successes in various scenarios have demonstrated that it is possible to annotate a massive number of images by leveraging human power. Unfortunately, manual image annotation can be a tedious and labor-intensive process.

What are needed are efficient systems for performing annotation of multimedia content.

SUMMARY OF THE INVENTION

Disclosed is a computer program product including machine executable instructions stored on machine readable media, the product for at least one of tagging and browsing multimedia content, the instructions including instructions for: providing a tagging annotation interface adapted for allowing at least one user to manually associate at least one keyword with at least one multimedia document; providing a browsing annotation interface adapted for allowing the user to judge relevance of at least one keyword and at least one automatically associated multimedia document; providing an annotation candidate selection component that is adapted for automatically associating at least one annotation keyword and at least one multimedia document, and manually associating the at least one selected annotation keyword with the at least one multimedia document; and a selection tool for permitting the user to select at least one of the tagging annotation interface and the browsing annotation interface.

Also disclosed is a system for annotating multimedia documents, the system including: a processing system for implementing machine executable instructions stored on machine readable media; and a computer program product including machine executable instructions stored on machine readable media coupled to the processing system, the product for at least one of tagging and browsing multimedia content, the instructions including instructions for: providing a tagging annotation interface adapted for allowing at least one user to manually associate at least one keyword with at least one multimedia document; providing a browsing annotation interface adapted for allowing the user to judge relevance of at least one keyword and at least one automatically associated multimedia document; providing an annotation candidate selection component that is adapted for automatically associating at least one annotation keyword and at least one multimedia document, and manually associating the at least one selected annotation keyword with the at least one multimedia document; and a selection tool for permitting the user to select at least one of the tagging annotation interface and the browsing annotation interface.

In addition, a system for annotating multimedia documents, is disclosed and includes: at least one input device and at least one output device, the input device and the output device adapted for interacting with machine executable instructions for annotating the multimedia documents through an interface; the interface communicating the interaction to a processing system including a computer program product including machine executable instructions stored on machine readable media, the product for at least one of tagging and browsing multimedia content, the instructions including instructions for: providing a tagging annotation interface adapted for allowing at least one user to manually associate at least one keyword with at least one multimedia document; providing a browsing annotation interface adapted for allowing the user to judge a relevance of at least one keyword and at least one automatically associated multimedia document; providing an annotation candidate selection component that is adapted for automatically associating at least one annotation keyword and at least one multimedia document, and manually associating the at least one selected annotation keyword with the at least one multimedia document; and a selection tool for permitting the user to select at least one of the tagging annotation interface and the browsing annotation interface.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The present invention is directed towards a method, apparatus and computer program products for improving the efficiency of manual annotation processes for multimedia documents. The techniques presented permit automatic and manual annotation of multimedia documents using keywords and various annotation interfaces. Disclosed herein are embodiments that provide automatic learning for improving the efficiency of manual annotation of multi-media content. The techniques call for, among other things, suggesting images, as well as appropriate keywords and annotation interfaces to users.

As discussed herein, "multi-media content," "multi-media documents" and other similar terms make reference to electronic information files that include at least one mode of information. For example, a multimedia document may include at least one of graphic, text, audio and video information. The multimedia document may convey any type of content as may be conveyed in such formats or modes.

Figure 1:
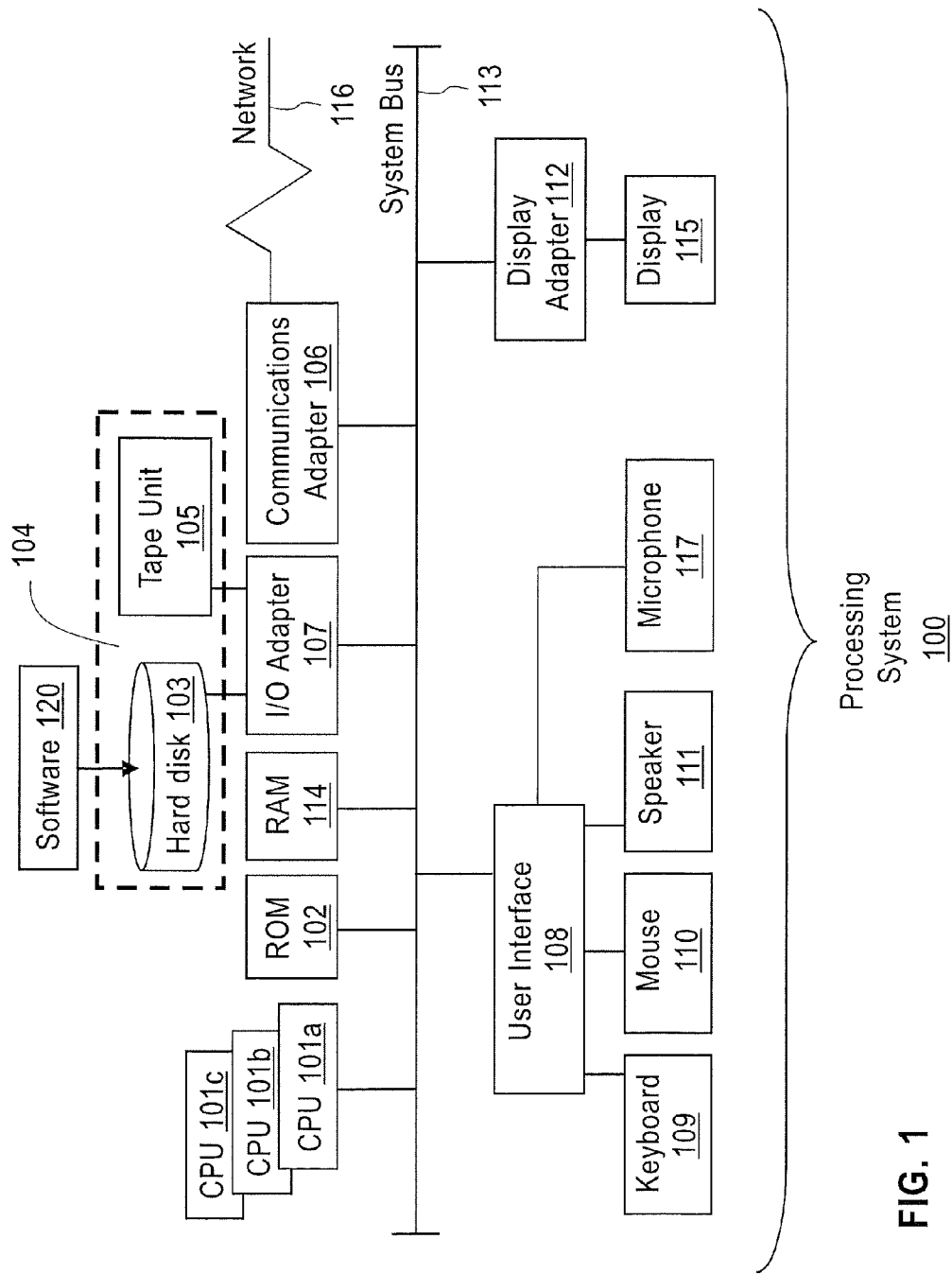
FIG. 1 illustrates one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, a speaker 111 and a microphone 117 may all be interconnected to bus 113 via user interface 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows (such as Windows 95, Windows 98, Windows NT 4.0, Windows XP, Windows 2000, Windows CE and Windows Vista), Macintosh, Java, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 103) for annotation of multimedia content. As discussed herein, the instructions are referred to as "software" 120. The software 120 may be produced using software development tools as are known in the art. Also discussed herein, the software 120 may also referred to as an "annotation tool" 120, or by other similar terms. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
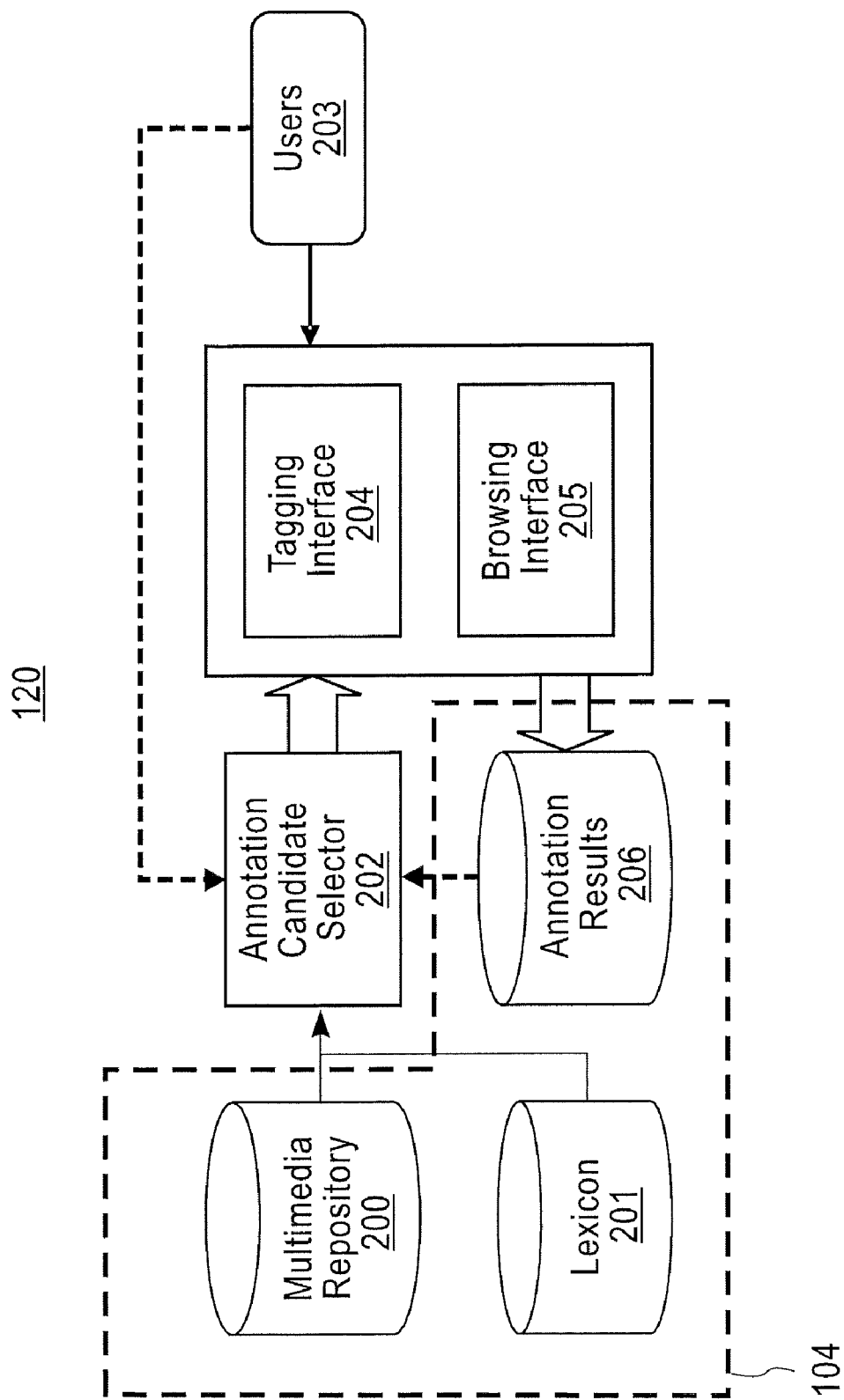
FIG. 2 is a schematic diagram showing respective components for an embodiment of the invention.

In reference to FIG. 2, a dataflow and system architecture diagram for a hybrid tagging/browsing annotation system is depicted, in accordance with an illustrative embodiment. As depicted, an annotation candidate selector 202 chooses a set of multimedia documents from the multimedia repository 200, a set of keywords from the lexicon 201 and the corresponding annotation interface for the next step. Each multimedia document can be associated with information from multiple modalities such as text, visual and audio. Depending on the purpose of user annotation, the lexicon can be either uncontrolled or controlled by a predefined vocabulary. For example, the Library of Congress Thesaurus of Graphical Material (TGM) provides a set of categories for cataloging photographs and other types of graphical documents. This set of categories can be used for annotating graphical documents. Moreover, the lexicon 201 can cover diverse topics such as visual (nature, sky, urban, studio), events (sports, entertainment), genre (cartoon, drama), type (animation, black-and-white), and so on.

As one may surmise, certain aspects of the software are predominantly maintained in storage 104. Examples include data structures such as the multimedia repository 200, the lexicon 201, annotation results 206 and the machine executable instructions that implement or embody the software 120.

After the set of documents, keywords and interfaces are identified by the annotation candidate selector 202, the annotation candidate selector 202 passes the information to the corresponding tagging interface 204 and/or browsing interface 205, which shows the documents and keywords on display devices. Users 203, interacting via the selected user interface and input device, issue related keywords through the tagging interface 204 and/or provide document relevance judgment through the browsing interface 205 in order to produce the annotation results 206. The number of users 203 can be one or more than one. The annotation results can then be sent back to annotation candidate selector 202 so as to update the selection criteria and annotation parameters in order to further reduce the annotation time. The annotation candidate selector 202 iteratively passes the selected multimedia documents and keywords to the tagging interface 204 and/or browsing interface 205 until all multimedia documents from multimedia repository 200 are annotated. However, the annotation process can also be stopped before all images or videos are fully annotated when, for example, users are satisfied with the current annotation results or they want to switch to automatic annotation methods.

Figure 3:
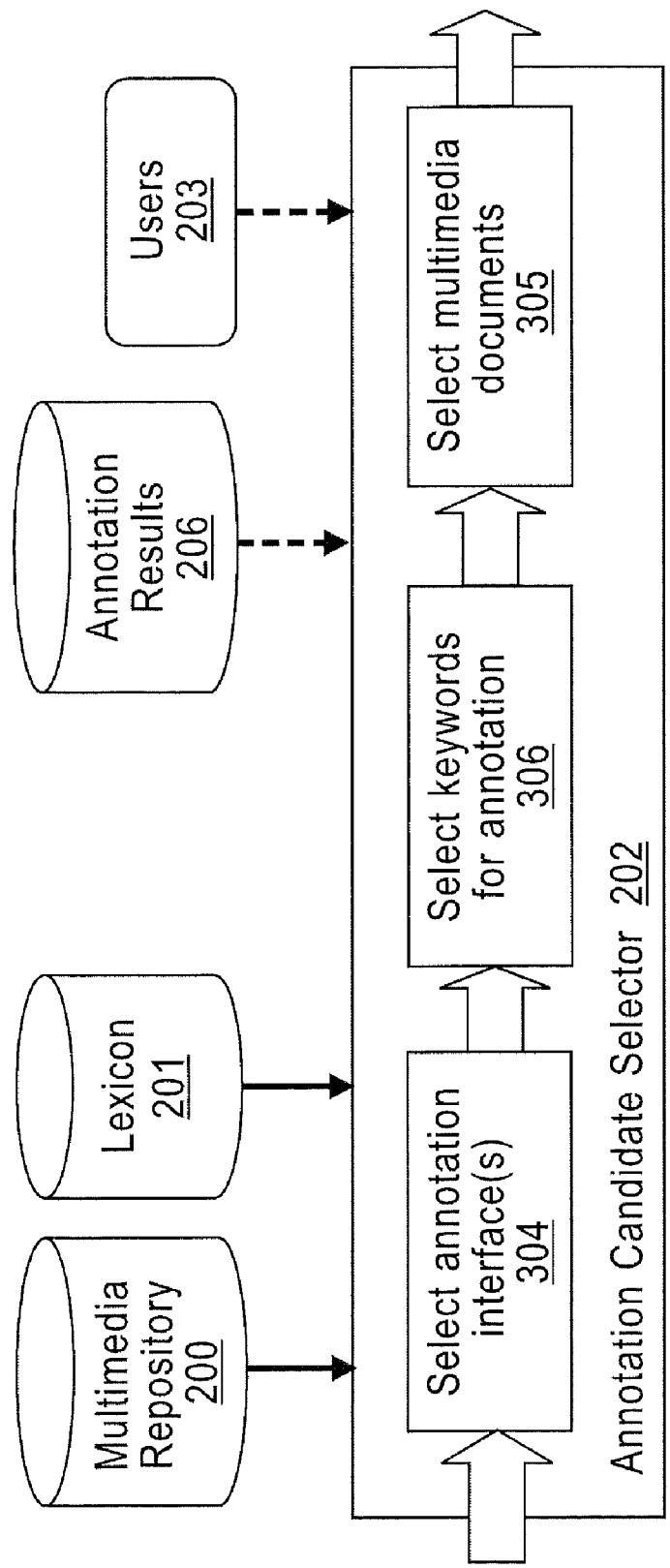
FIG. 3 is a schematic diagram illustrating the component of annotation candidate selector in which multimedia documents, keywords, and interface are selected for further processing.

In reference to FIG. 3, the detailed process of the annotation candidate selector 202 is depicted, which further illustrates the module depicted in FIG. 2. In this example, the annotation candidate selector 202 generally performs three tasks. These tasks are: select the annotation interface 304, select keywords for annotation 306, and select multimedia documents for annotation 305. Note that the order of these tasks may be different in the implementation and this is merely one illustrative example. In this embodiment, the interface to be used for annotation is first selected based on the current set of un-annotated multimedia documents in the multimedia repository 200, the given lexicon 201 and possibly the current annotation results 206 from user input. One or both of the tagging interface 204 and the browsing interface 205 can then be chosen. The system then selects the corresponding keywords that fit with the selected interfaces. For instance, if the browsing interface 205 is chosen, the keywords that are associated with a lot of potentially relevant documents are typically selected for browsing. If a tagging interface 204 is chosen, all the keywords are usually taken into consideration. Finally, given the interface and keywords, a set of multimedia documents are chosen which are related to the keywords and suitable for the interface. Each of these three components may be associated with certain selection criteria, such as those related to word frequency, average annotation time per word, image visual similarity and so on. The selection criteria can also be determined by machine learning models with associated parameters automatically learned from the user annotation results 206 and multi-modal features such as text, visual, audio and so on.

In one embodiment, the annotation candidate selector 202 partitions the lexicon 201 into two sets based on keyword frequency in the multimedia repository. Then, the annotation candidate selector 202 chooses the browsing interface 205 for the frequent keywords and the tagging interface 204 for the infrequent keywords. The multimedia documents can be randomly selected or selected in a given order until all the documents are annotated. For example, if the lexicon 201 includes person-related keywords, the keywords of "Baby", "Adult" and "Male" could be annotated by the browsing interface 205, because they are likely to frequently appear in the multimedia repository 200. On the other hand, the keywords referring to specific person names, such as "George Bush" and "Bill Clinton", can be annotated by the tagging interface 204, because they do not appear as frequently as the general keywords. The boundary for determining frequent keywords and infrequent keywords can be derived from various types of information, including user's average tagging time per image and per keyword, user's average browsing time per image and per keyword, total number of documents, and so forth.

In an alternative embodiment, the annotation candidate selector 202 determines the appropriate annotation interface for specific images and keywords by using machine learning algorithms that learn from the partial annotation results 206. In more detail, the software 120 starts by using the tagging interface 204 for annotating some initially selected documents. With more and more annotations collected, the annotation candidate selector 202 deploys a learning algorithm to dynamically find a batch of unannotated documents that are potentially relevant to a subset of keywords. Then, the annotation candidate selector 202 asks users 203 to annotate the batch of unannotated documents in a browsing interface 205.

Once these documents are browsed and annotated, the software 120 can switch back to tagging mode until it collects enough prospective candidates for browsing-based annotation with one or more keywords. This process iterates until all the images are shown and annotated in at least one of the tagging interface 204 and the browsing interface 205.

The objective of the aforementioned learning algorithm is to optimize the future annotation time based on the current annotation patterns. The learning algorithms include, but are not limited to, decision trees, k-nearest neighbors, support vector machines, Gaussian mixture models. These algorithms may also be learned from multi-modal features such as color, texture, edges, shape, motion, presence of faces and/or skin. Some of the advantages for the learning-based methods include no need to re-order the lexicon 201 by frequency and, that even for infrequent keywords, the algorithms can potentially discover a subset of images that are mostly relevant for them, and improve the annotation efficiency by switching to the browsing interface 205.

Figure 4:
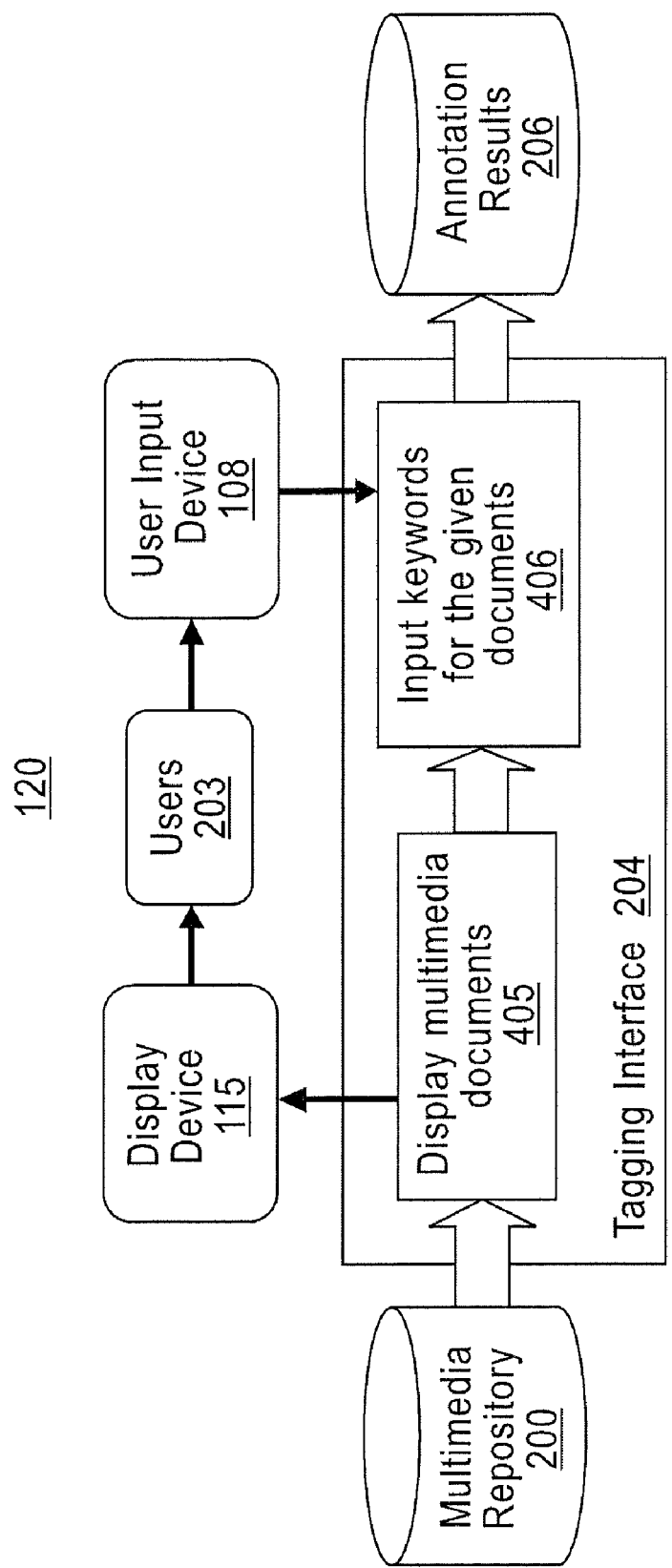
FIG. 4 is a schematic diagram illustrating the component of tagging interface which allows users to input related keywords for a given image.

Now in reference to FIG. 4, a dataflow and a system architecture diagram for the user tagging interface 204 and system is depicted, which further illustrates the module 204 in reference to FIG. 2. The software 120 first retrieves the multimedia documents from the multimedia repository 200, as suggested by the annotation candidate selector 202 and displays these documents to the connected display device 115 as a process 405. Exemplary display devices 115 include, but are not limited to, a desktop monitor, a laptop monitor, a personal digital assistant (PDA), a phone screen, and a television. One or more than one multimedia documents can be displayed on the display device 115 at the same time. Users 203 may then access the multimedia documents one at a time through the display device 115, to gain knowledge regarding the content of the document. Through a user input device 108, users can annotate the documents with any relevant keywords that belong to the given lexicon 201. For example, if the user 203 finds the image is showing "George Bush in front of a car", the user 203 may annotate the image(s) with the keywords "person", "president", "car" and "vehicle", (it is assumed that these words are available in the lexicon 201). Exemplary input devices 108 include, but are not limited to, a computer keyboard 109, a mouse 110, a mobile phone keypad, a PDA with a touch screen and a stylus, or a speech-to-text recognition and transcription device, and others. Each keyword can be associated with a confidence score which reflects the confidence, or lack of uncertainty (collectively referred to as "confidence"), by which the users associate the keywords with the documents. For instance, considering the keyword "car" as above, the score may indicate the confidence with which users believe the keyword is relevant to the documents. If the "car" is only partly shown or does not constitute a significant part of the multimedia document(s), then a low confidence score may be determined. However, if the "car" is clearly present or predominates in the document, then a high confidence score may be determined. These scores can be used to index, rank and retrieve the multimedia documents in the future. Finally, all the keywords together with the corresponding confidence scores are organized to produce the annotation results 206. The annotation results 206 can be used to update the selection criteria that are used in the annotation candidate selector 202.

Figure 5:
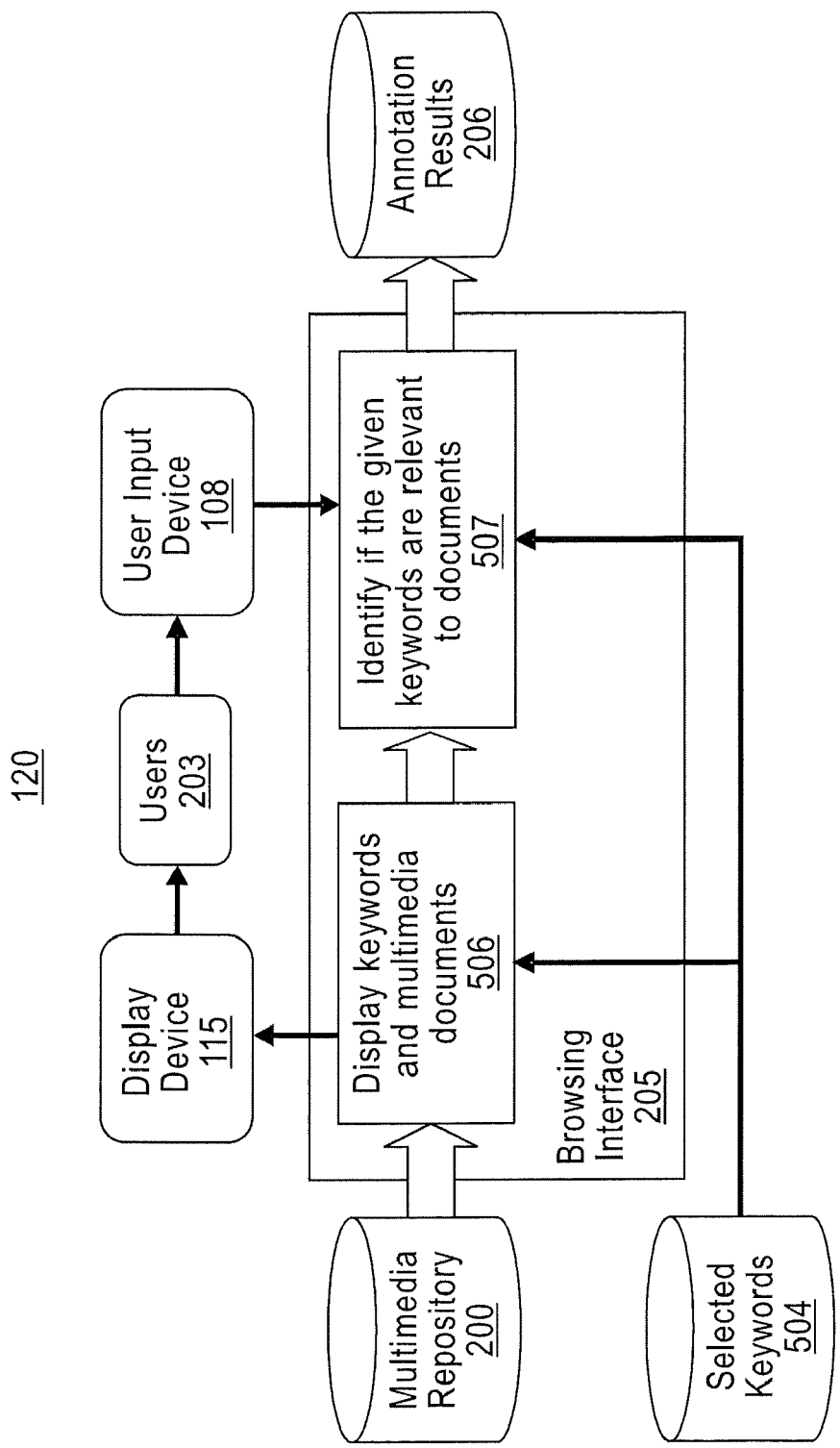
FIG. 5 is a schematic diagram illustrating the component of browsing interface which allows users to judge the relevance between a plurality of multimedia documents with one or more given keyword.

In reference to FIG. 5, a dataflow and a system architecture diagram for the user browsing interface 205 and system is depicted, which further illustrates the module depicted in FIG. 2. Similar to implementation of the tagging interface 204, the software 120 first retrieves the multimedia documents from the document repository 200, as suggested by the annotation candidate selector 202, and then displays these documents to the connected display device 115 as process 506. Users 203 then access the multimedia documents through the display device 115 to gain knowledge of the content. At least one of the multimedia documents can be displayed on the display device 115 at the same time. However, in the browsing interface 205, users 203 may also access selected keywords 504 that are provided by the annotation candidate selector 202. Through a user input device 108, users are requested to judge the relevance between the selected keywords 504 and the multimedia documents. For instance, if a keyword "person" is shown with a portrait image of "George Bush", users will annotate the keyword relevance as positive. But if the keyword "person" is shown with a nature scene image without any persons, users will annotate the keyword relevance as negative. Similarly to tagging, each keyword can be associated with a confidence score which reflects the confidence by which the users associate the keywords with the documents. Finally, all the keywords together with the corresponding confidence scores are organized to produce the annotation results 206.

Figure 6:
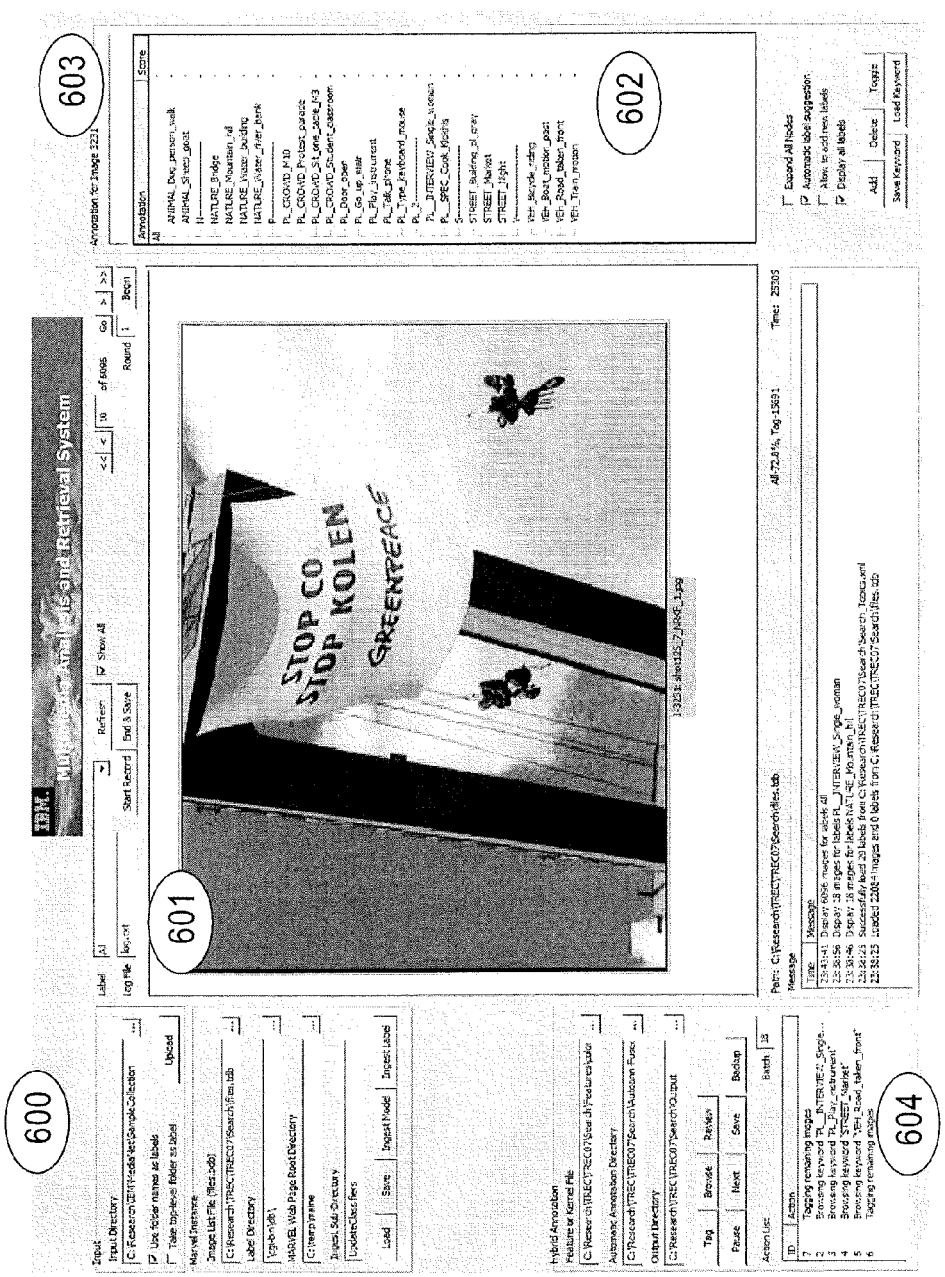
FIG. 6 is an exemplary graphic environment implementing the present invention when its tagging interface is displayed.

Referring now to FIG. 6, an exemplary graphic environment 600 implementing the software 120 with its tagging interface 204 is shown based on an embodiment thereof. The graphic environment includes a display area showing an example image 601 for users to annotate. It can be appreciated that the image 601 may come, for instance, from photo collections, video frames, or can be provided by a multimedia capturing device (such as digital camera). Users can use the mouse 110 or the arrow keys on the keyboard 109 to navigate the choice of images from the collection. On the right side of the tagging interface 204, the lexicon panel 602 lists all the keywords in the lexicon 201 which may be used to annotate the image 601. Users 203 may input the related keywords using an editor control 603 on top of the lexicon panel, or double click the corresponding keyword to indicate a degree of relation to the displayed image 601. In certain applications, these keywords are preferably not to be placed on the surrounding area but instead on the image 601 itself. The interface action panel 604 lists all the interface switching actions suggested by the annotation candidate selector 202. Users 203 can choose to keep using the current interface, or take the next action in the panel 604 in order to switch to a new interface. If the interface is switched, the software 120 will then load the corresponding keywords and images 601 to the imaging area.

Figure 7:
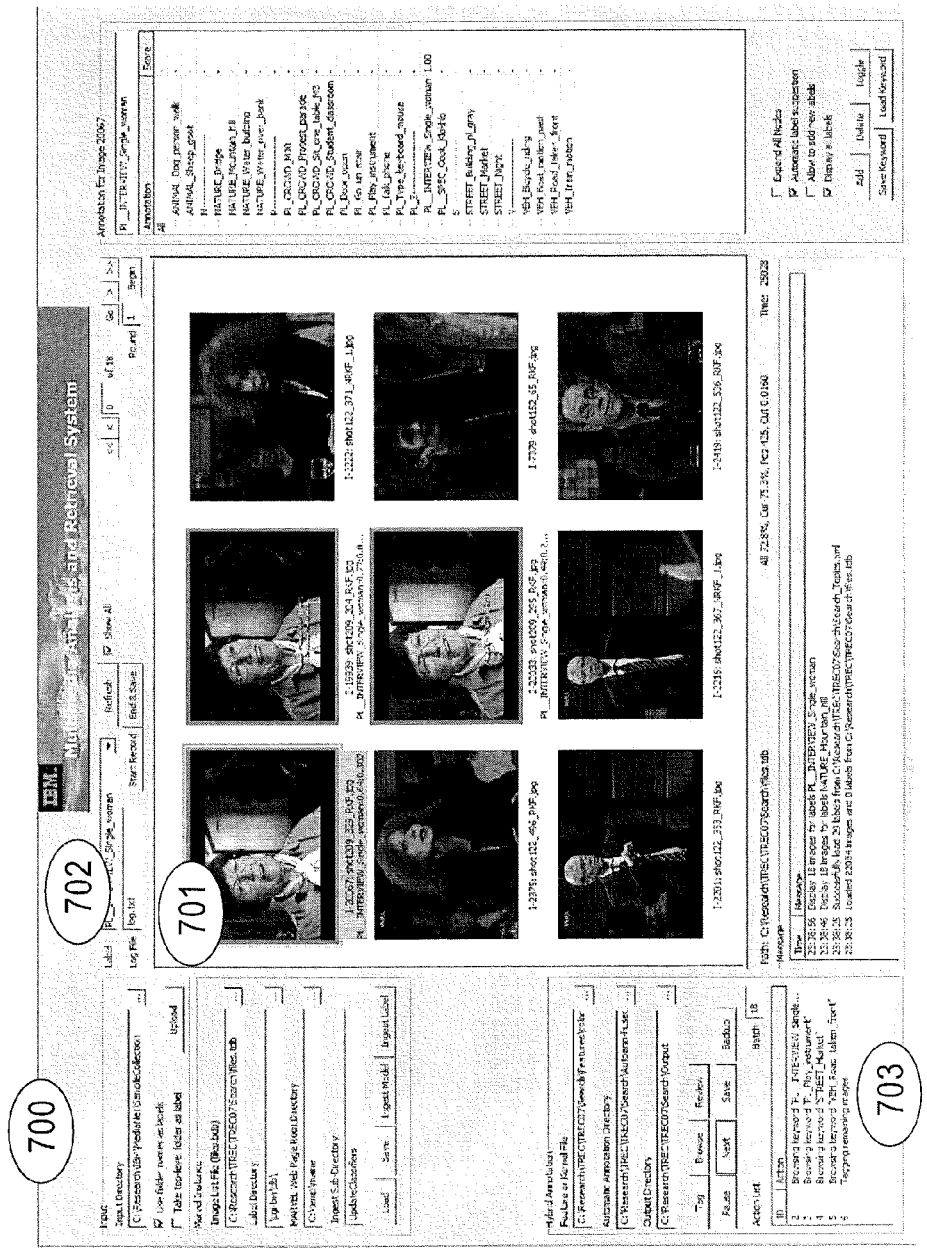
FIG. 7 is an exemplary graphic environment implementing the present invention when its browsing interface is displayed.

Referring now to FIG. 7, an exemplary graphic environment (700) implementing the software 120 with the browsing interface 205 is shown based on an embodiment thereof. The graphic environment includes a display area showing multiple example images 701 for users to annotate. In this example, the selected images 701 are organized in a 3×3 image grid. Users 203 can use the mouse 110 or the arrow keys on the keyboard 109 to navigate the choice of images 701 from the collections. The selected keyword suggested by the annotation candidate selector is shown in a keyword combo-box 702. Users can click with a mouse 110 or press the space key on a specified image 701 to toggle the relevance of the keyword to the image 701. The images 701 that are judged relevant to the given keywords are overlaid with a colored border (e.g., red) and the irrelevant images are overlaid with another colored border (e.g., yellow). Similar to the tagging interface 204, the interface action panel 703 lists all the interface switching actions suggested by the annotation candidate selector 202. Users 203 can choose to keep using the current interface, or take the next action in the panel 703 in order to switch to a new interface.

In an alternative embodiment, the tagging interface 204 and the browsing interface 205 can be shown in the same display area without asking users to explicitly switch interfaces. Users can provide inputs to both interfaces at the same time.

Advantageously, use of automatic techniques speed up the manual image annotation process and help users to create more complete/diverse annotations in a given amount of time. Accordingly, the teachings herein use automatic learning algorithms to improve the manual annotation efficiency by suggesting the right images, keywords and annotation interfaces to users. Learning-based annotation provides for simultaneous operation across multiple keywords and dynamic switching to any keywords or interfaces in the learning process. Thus, a maximal number of annotations in a given amount of time may be realized.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising machine executable instructions stored on non-transitory machine readable media, the product for at least one of tagging and browsing multimedia content, the instructions comprising instructions for:
   providing a tagging annotation interface adapted for allowing at least one user to manually associate at least one keyword with at least one multimedia document;
   providing a browsing annotation interface adapted for allowing the user to judge a relevance of at least one keyword and at least one automatically associated multimedia document;
   providing an annotation candidate selection component that is adapted for automatically associating at least one annotation keyword and at least one multimedia document, and manually associating the at least one selected annotation keyword with the at least one multimedia document; and
   a selection tool configured to select at least one of the tagging annotation interface and the browsing annotation interface according to at least one of a learning model and an input from the user;
   wherein the learning model is related to of word frequency and average annotation times per word; and wherein the selection tool is configured to select between the browsing annotation interface for frequent keywords and the tagging annotation interface for infrequent keywords;
   wherein a boundary for determining the frequent keywords and the infrequent keywords is derived from user's average tagging time per image, user's average tagging time per keyword, user's average browsing timer per image, user's average browsing time per keyword, and a total number of documents.

2. The computer program product as in claim 1, further comprising instructions for providing output to at least one of a monitor, a cell phone, and a personal digital assistant (PDA).

3. The computer program product as in claim 1, further comprising instructions for receiving input from at least one of a keyboard, a mouse, a touch screen, a stylus, a microphone, and a speech interface.

4. The computer program product as in claim 1, wherein the at least one keyword has a relationship to an event topic which can include information derived from sports, news and entertainment; and
   wherein the at least one keyword has a relationship to a genre topic which can include information derived from a cartoon and a drama.

5. The computer program product as in claim 1, wherein the selection tool is configured to partition a plurality of keywords based on keyword frequency; and
   wherein, via the browsing interface, images judged relevant to given keywords are overlaid with a colored border and the images judged irrelevant are overlaid with another colored border.

6. The computer program product as in claim 1, wherein the learning model learns from multi-modal information comprising at least one of visual, audio and text information.

7. The computer program product as in claim 1, wherein the learning model is related to visual similarity.

8. The computer program product as in claim 1, wherein the learning model is based on at least one of a decision tree, a k-nearest neighbor classification, a support vector machine and a Gaussian mixture model.

9. The computer program product as in claim 1, wherein the learning model is updated based on user annotation results.

10. The computer program product as in claim 1, wherein the learning model is adapted for minimizing time required for the user to associate the at least one keyword with the multimedia document.

11. The computer program product as in claim 1, wherein the annotation candidate selection component is adapted for terminating a process of automatically associating the at least one keyword and the at least one multimedia document.

12. The computer program product as in claim 1, wherein the automatically associating and the manually associating provides for at least one of annotating training data for automatic learning; annotating at least one of image and video collections for at least one of search and retrieval; amusement; personal media management and archival of the at least one multimedia document.

13. A system for annotating multimedia documents, the system comprising:
   a processing system;
   a software application, the software application configured for at least one of tagging and browsing multimedia content, instructions of the software application for:
   providing a tagging annotation interface adapted for allowing at least one user to manually associate at least one keyword with at least one multimedia document;
   providing a browsing annotation interface adapted for allowing the user to judge a relevance of at least one keyword and at least one automatically associated multimedia document;
   providing an annotation candidate selection component that is adapted for automatically associating at least one annotation keyword and at least one multimedia document, and manually associating the at least one selected annotation keyword with the at least one multimedia document; and
   a selection tool configured to select at least one of the tagging annotation interface and the browsing annotation interface according to at least one of a learning model and an input from the user;
   wherein the learning model is related to of word frequency and average annotation times per word; and wherein the selection tool is configured to select between the browsing annotation interface for frequent keywords and the tagging annotation interface for infrequent keywords;

wherein a boundary for determining the frequent keywords and the infrequent keywords is derived from user's average tagging time per image, user's average tagging time per keyword, user's average browsing timer per image, user's average browsing time per keyword, and a total number of documents.

14. The system as in claim 13, further comprising at least one adapter for communication with a network.

15. A system for annotating multimedia documents, the system comprising:

at least one input device and at least one output device, the input device and the output device adapted for interacting with machine executable instructions for annotating the multimedia documents through an interface;

the interface communicating the interaction to a processing system comprising a computer program product comprising machine executable instructions stored on machine readable media, the product for at least one of tagging and browsing multimedia content, the instructions comprising instructions for:

providing a tagging annotation interface adapted for allowing at least one user to manually associate at least one keyword with at least one multimedia document;

providing a browsing annotation interface adapted for allowing the user to judge a relevance of at least one keyword and at least one automatically associated multimedia document;

providing an annotation candidate selection component that is adapted for automatically associating at least one annotation keyword and at least one multimedia document, and manually associating the at least one selected annotation keyword with the at least one multimedia document; and a selection tool configured to select at least one of the tagging annotation interface and the browsing annotation interface according to at least one of a learning model and an input from the user; and wherein the learning model is related to of word frequency and average annotation times per word; and wherein the selection tool is configured to select between the browsing annotation interface for frequent keywords and the tagging annotation interface for infrequent keywords;

wherein a boundary for determining the frequent keywords and the infrequent keywords is derived from user's average tagging time per image, user's average tagging time per keyword, user's average browsing timer per image, user's average browsing time per keyword, and a total number of documents.

* * * * *